United States Patent
Hutchinson

[11] Patent Number: 5,813,294
[45] Date of Patent: Sep. 29, 1998

[54] SAW BLADE TEETH SETTING APPARATUS

[76] Inventor: Ben Maxwell Hutchinson, 13 Industrial Ave., Caloundra, Queensland, 4551, Australia

[21] Appl. No.: 706,284

[22] Filed: Sep. 4, 1996

[30]     Foreign Application Priority Data

Sep. 8, 1995  [AU]  Australia ............................... 30508/95

[51] Int. Cl.$^6$ .................................................. B23D 63/02
[52] U.S. Cl. ...................................... 76/63; 76/58
[58] Field of Search ................................. 76/58, 61, 62, 76/63, 66, 67, 68, 71

[56]            References Cited

U.S. PATENT DOCUMENTS

| | | | |
|---|---|---|---|
| 454,679 | 6/1891 | Erlandson | 76/63 |
| 488,829 | 12/1892 | Pinke | 76/63 |
| 557,959 | 4/1896 | Bredin | 76/61 |
| 1,221,343 | 4/1917 | Mackintosh et al. | 76/68 |
| 1,468,986 | 9/1923 | Wilthil | 76/58 |
| 2,498,167 | 2/1950 | Lorenz | 76/58 |

*Primary Examiner*—Hwei-Siu Payer
*Attorney, Agent, or Firm*—Hoffman, Wasson & Gitler, P.C.

[57]            ABSTRACT

An apparatus for setting teeth on a saw blade is disclosed. The apparatus has a control shaft which has setting cams for pivoting a tooth setting block. An indexing arm is caused to pivot by an indexing cam to cause a blade held by the apparatus to move through the apparatus in a timed stepwise fashion. Clamping jaws are movable relative to one another by a cam carried by the shaft to hold the blade during tooth setting and to release the blade for indexing through the apparatus.

13 Claims, 8 Drawing Sheets

SAW BLADE TEETH SETTING APPARATUS

BACKGROUND OF THE INVENTION

THIS INVENTION relates to a saw blade teeth setting apparatus. In particular, the invention relates to an apparatus for setting the teeth of a band saw blade. The invention will be described by way of example with reference to its preferred use with a band saw blade. It should be appreciated that the apparatus of the invention may be used for setting teeth on blades other than band saw blades.

The manufacture of a band saw blade involves forming a plurality of teeth along one edge of the band which ultimately will form the blade. When these teeth are formed they are initially contained within the plane of the blade and it is necessary to cause or set the teeth so that particular ones of them project outwardly from the plane of the blade in one direction or other. It is not unusual for alternate teeth to be required to alternately project to one side of the blade and then to the other along the length of the blade. Indeed some times, one tooth may project to the left of the blade, the next tooth project to the right of the blade and a third tooth may be left remaining in the plane of the blade and this sequence is then repeated along the length of the blade. Once the teeth have been set in a desired configuration, cutting edges are then formed, typically by grinding on suitable edges of the teeth.

Complex machines exist for setting the teeth on saw blades and it is an object of the present invention to provide an apparatus for setting teeth of a blade which is relatively simple in its construction and use.

SUMMARY OF THE INVENTION

According to one aspect the invention provides an apparatus for setting teeth of a blade, the apparatus including a body, a control shaft extending across the body and having a plurality of cams, a pair of blade clamping blocks adapted for relative movement towards and away from one another, one of the jaws being movable relative to the other of the jaws as a consequence of engagement of a cam follower with one of the cams on the shaft to clamp a blade to the apparatus.

Preferably, the apparatus of the invention includes a clamping slide mounted for movement relative to the one jaw and the cam follower which engages the cam being associated with the slide to cause the slide to reciprocate to thereby move the one jaw towards and away from the other jaw. Preferably, the apparatus includes a reaction block and the slide is located between the reaction block and the one jaw.

Preferably, the control shaft has a pair of spaced outer cams and a pair of inner cams, one of the inner cams being engageable by the cam follower to move the jaw. Preferably the outer cams have at least one lobe and the inner cams have a plurality of lobes.

The apparatus may have a teeth setting block mounted for pivotal movement by the outer pair of cams. The setting block having fingers for setting the teeth of the blade.

Spaced setting cam followers associated with the block are able to engage with the outer cams for pivoting the block.

The apparatus may have an indexing arm mounted for pivotal movement. The indexing arm may carry a cam follower for engagement with the other of the inner cams to cause the indexing arm to pivot. An indexing finger may be carried by the arm for contacting the blade to indexing the blade through the apparatus.

Preferably, the inner cams each include three cam lobes. The lobe on one of the outer cams is radially spaced from the lobe on the other of the outer cams. In one embodiment, the radial spacing between these lobes is 120°.

The lobes on the inner cams are radially equally spaced around the cam.

BRIEF DESCRIPTION OF THE DRAWINGS

A particular preferred embodiment of the invention will now be described by way of example with reference to the drawings in which.

DESCRIPTION OF THE INVENTION

Figure 1:
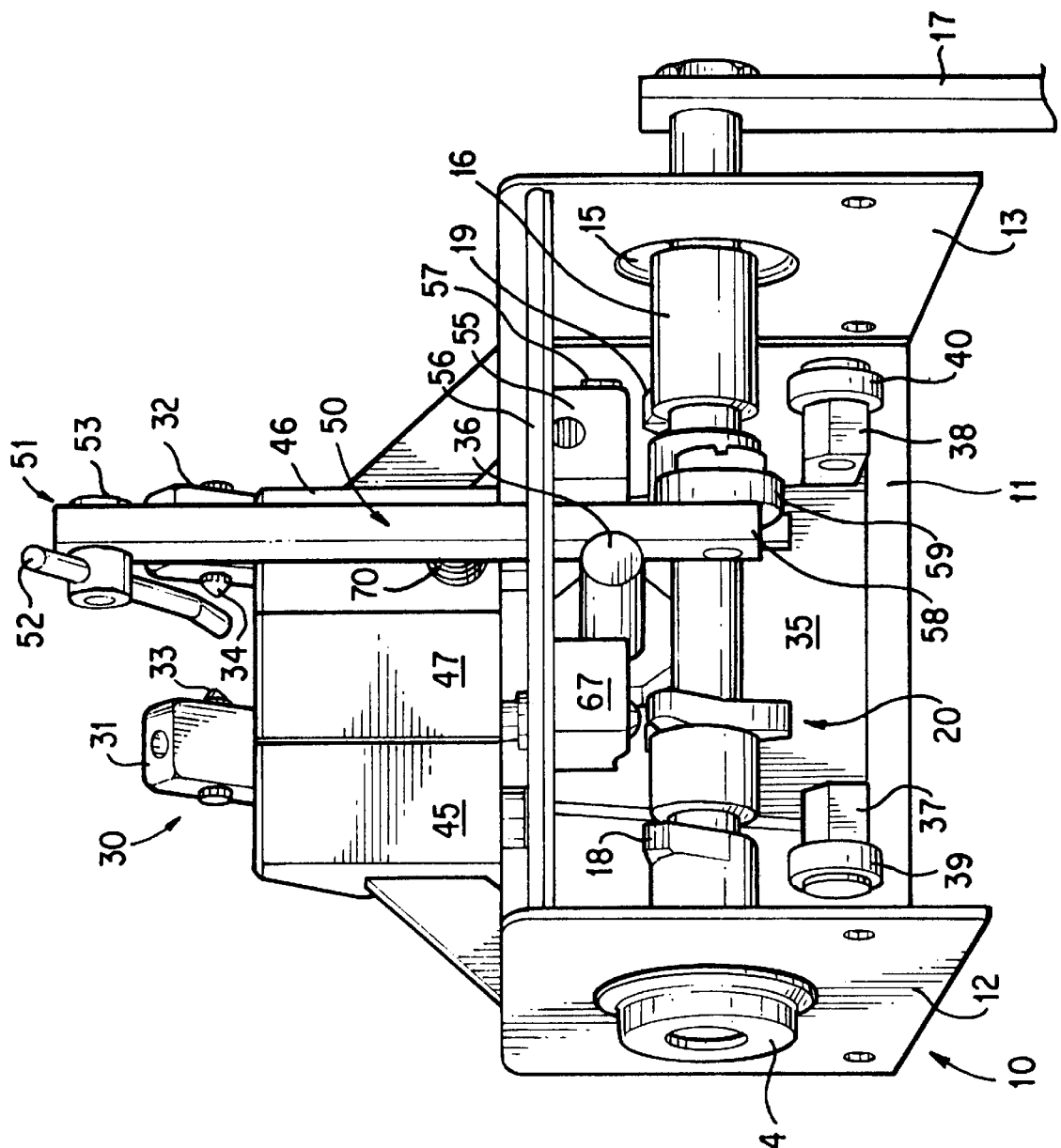
FIG. 1 is a front perspective view of a saw teeth setting apparatus according to one embodiment of the invention.
Figure 4:
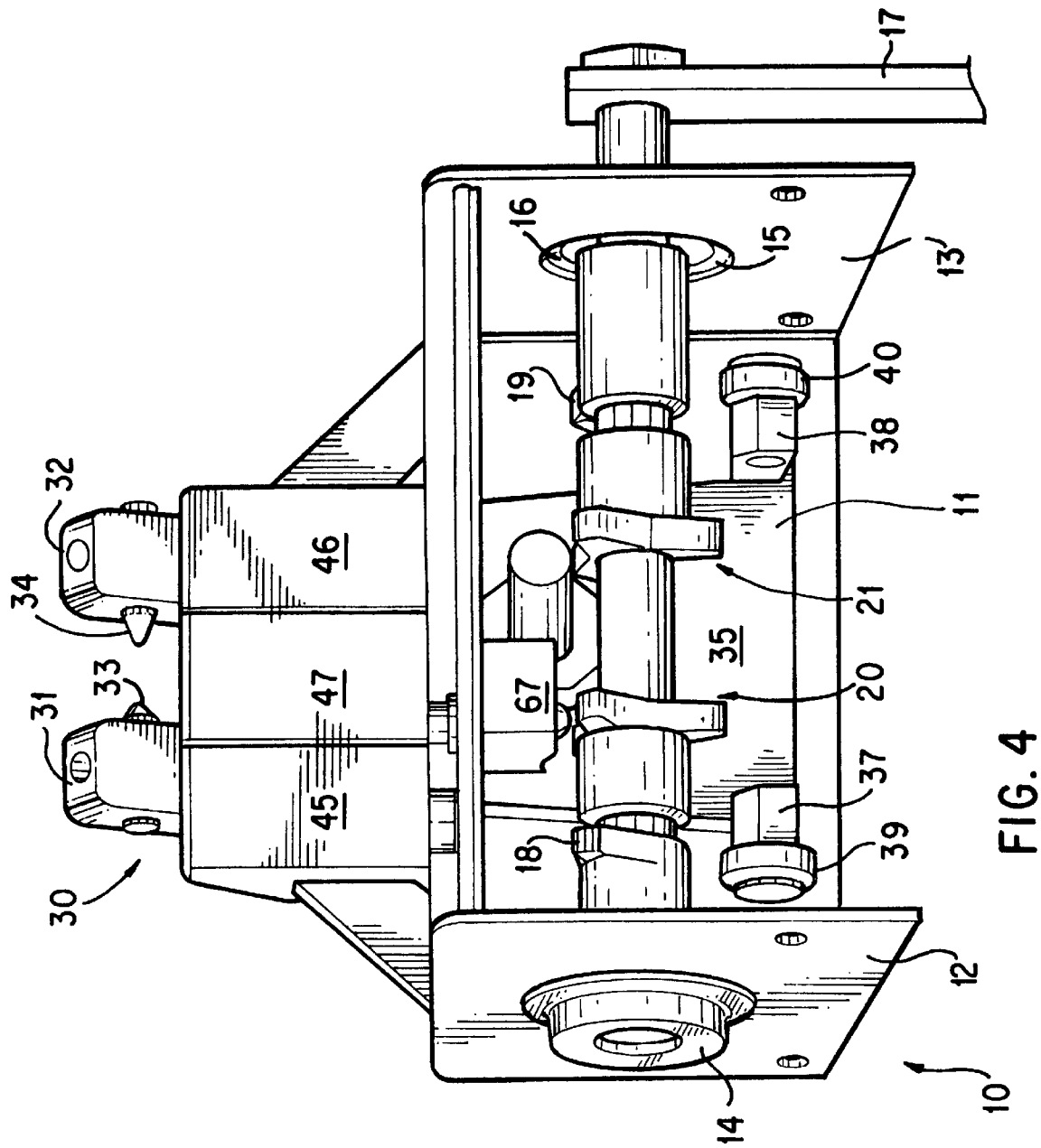
FIG. 4 is a perspective view of the apparatus but with the indexing arm omitted.

The apparatus 10 in FIGS. 1 and 4 is shown with a front plate removed to show internal components normally concealed by that plate. The apparatus has a rear wall 11 and opposed end walls 12, 13. Walls 12, 13 carry bearings 14, 15 in which a shaft 16 which extends longitudinally of the apparatus is journalled for rotation. The shaft 16 extends beyond end 13 and has an operating handle 17 secured to it. When handle 17 is operated shaft 16 is caused to rotate.

The shaft carries an outer pair of cams 18, 19 and a pair of inner cams 20, 21. Cam 21 is best seen in FIG. 4. The outer cams 18, 19 each have a single cam lobe and these lobes are radially spaced from one another by 60°. Inner cams 20, 21 each have three lobes and the cams 20, 21 are radially aligned with one another with the lobe on each cam being spaced at 60° from each other. The relative radial orientation of the inner and outer cams is best seen in FIG. 4.

Figure 6:
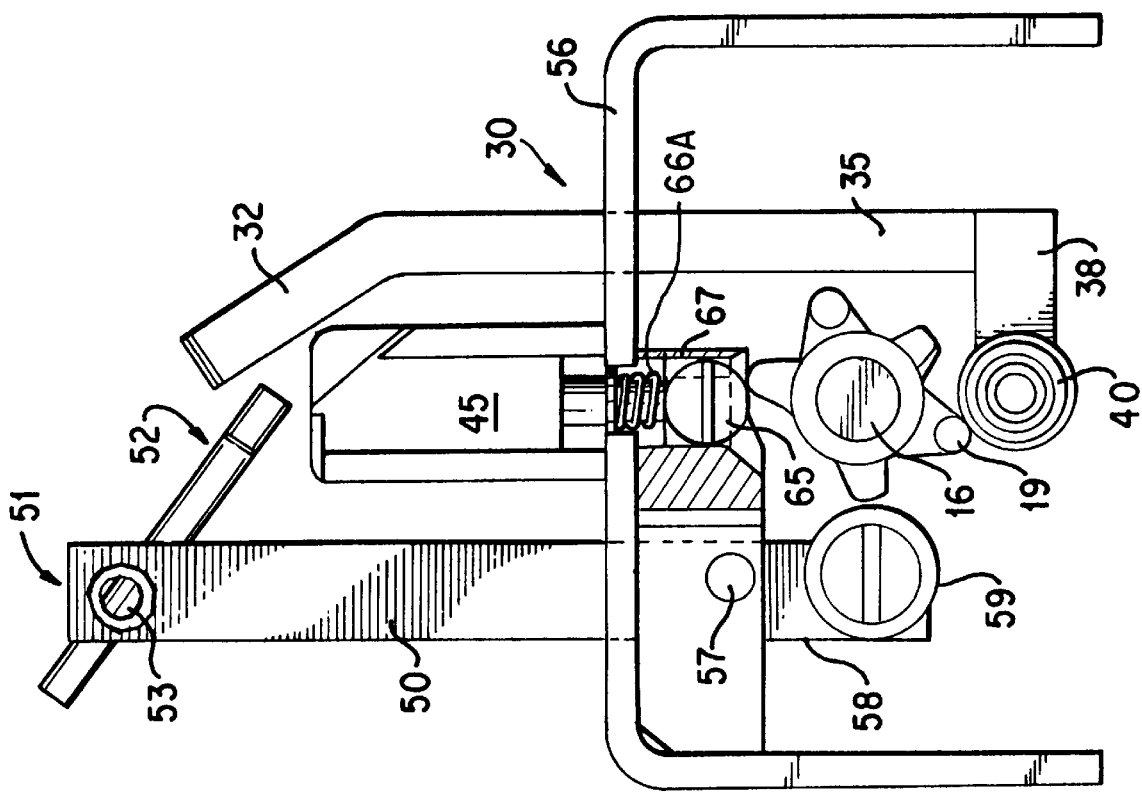
FIG. 6 is a side view of the apparatus taken from the right of FIG. 1 with some of the parts of the apparatus removed.

The apparatus has a setting block 30 consisting of setting arms 31, 32. These arms have cranked free ends (see FIG. 6) and carry setting fingers 33, 34 which are adapted to contact teeth on a saw blade which are to be set by the apparatus. The block 30 has a body 35 from which the arms 31, 32 extend. The body is mounted relative to a transversely extending shaft 36. Shaft 36 is mounted for rotation relative to rear wall 11 and front wall (not shown) of the apparatus. The lower edge of body 35 has two spaced return arms 37, 38 which extend at right angles to the body 35 and carry cam followers 39, 40. Cam 18 is able to contact follower 39 while cam 19 is able to contact cam follower 40 as shaft 16 rotates. As a consequence, the setting block 30 is caused to pivot from side to side to alternately bring setting fingers 33, 34 into contact with teeth on a saw blade to cause the teeth to be set to one or the other side of a plane containing the blade held by the apparatus.

The apparatus includes a stationary reaction block 45, a stationary clamping block 46 and a longitudinally movable clamping block 47. Block 47 is adapted to move towards block 46 to clamp a saw blade between it and block 46 and to move away from block 46 to release the blade.

Indexing arm 50 has an upper end 51 to which an indexing finger 52 is adjustably mounted by shaft 53. Mounting block 55 is secured to an upper wall 56 of the apparatus 10 and has a shaft 57 extending through it to which the arm 50 is secured. Shaft 57 allows the arm to pivot relative to block 55 and about an axis extending along shaft 57 which extends generally longitudinally of the apparatus. The lower end 58 of arm 50 carries a cam follower 59 which is contacted by cam 21 to cause the arm 50 to pivot and as a consequence, finger 52 engages the blade to move it through the apparatus.

Figure 2:
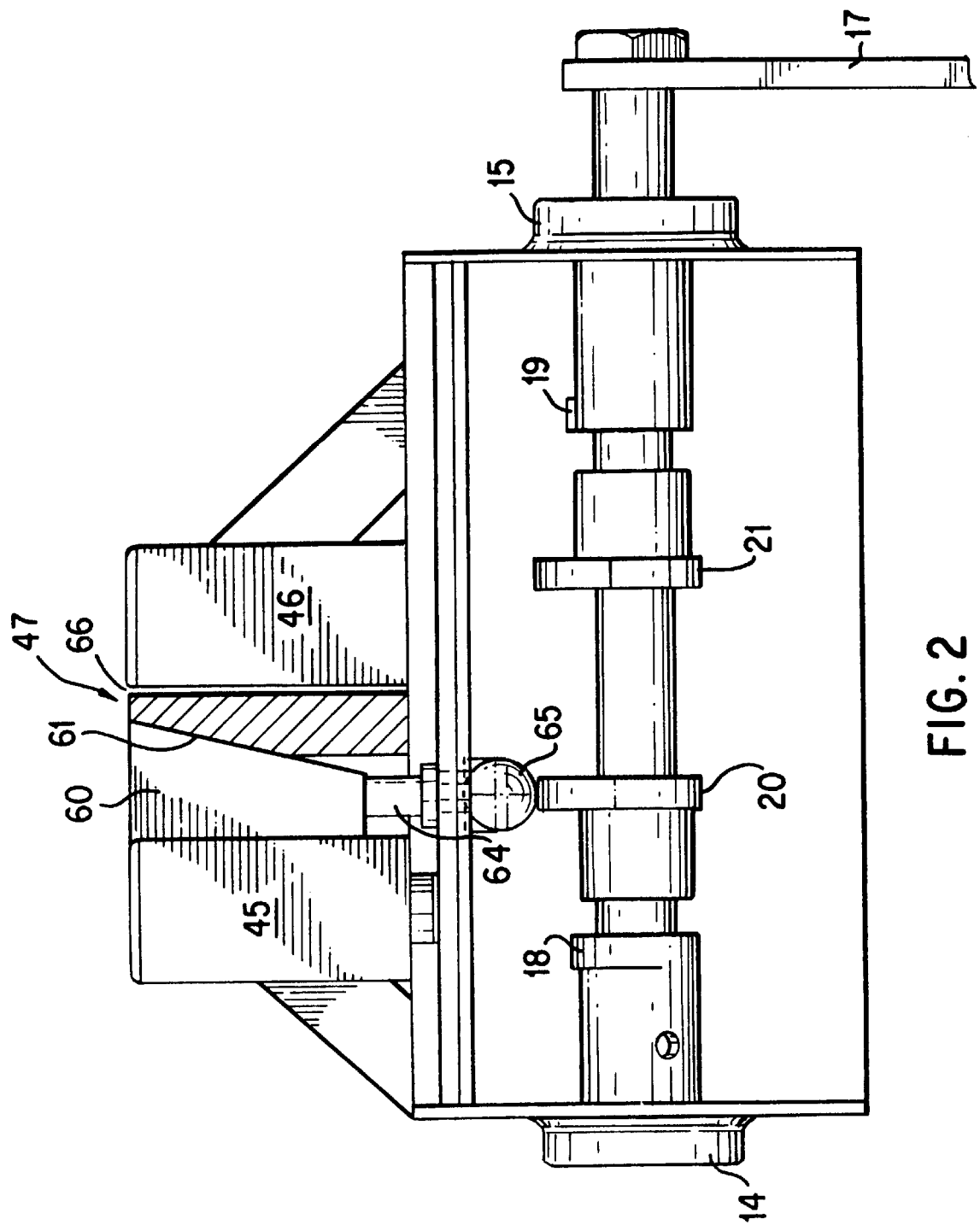
FIG. 2 is a front elevational view of the apparatus of FIG. 1 with the indexing arm removed and part of the centre clamping block removed.
Figure 3:
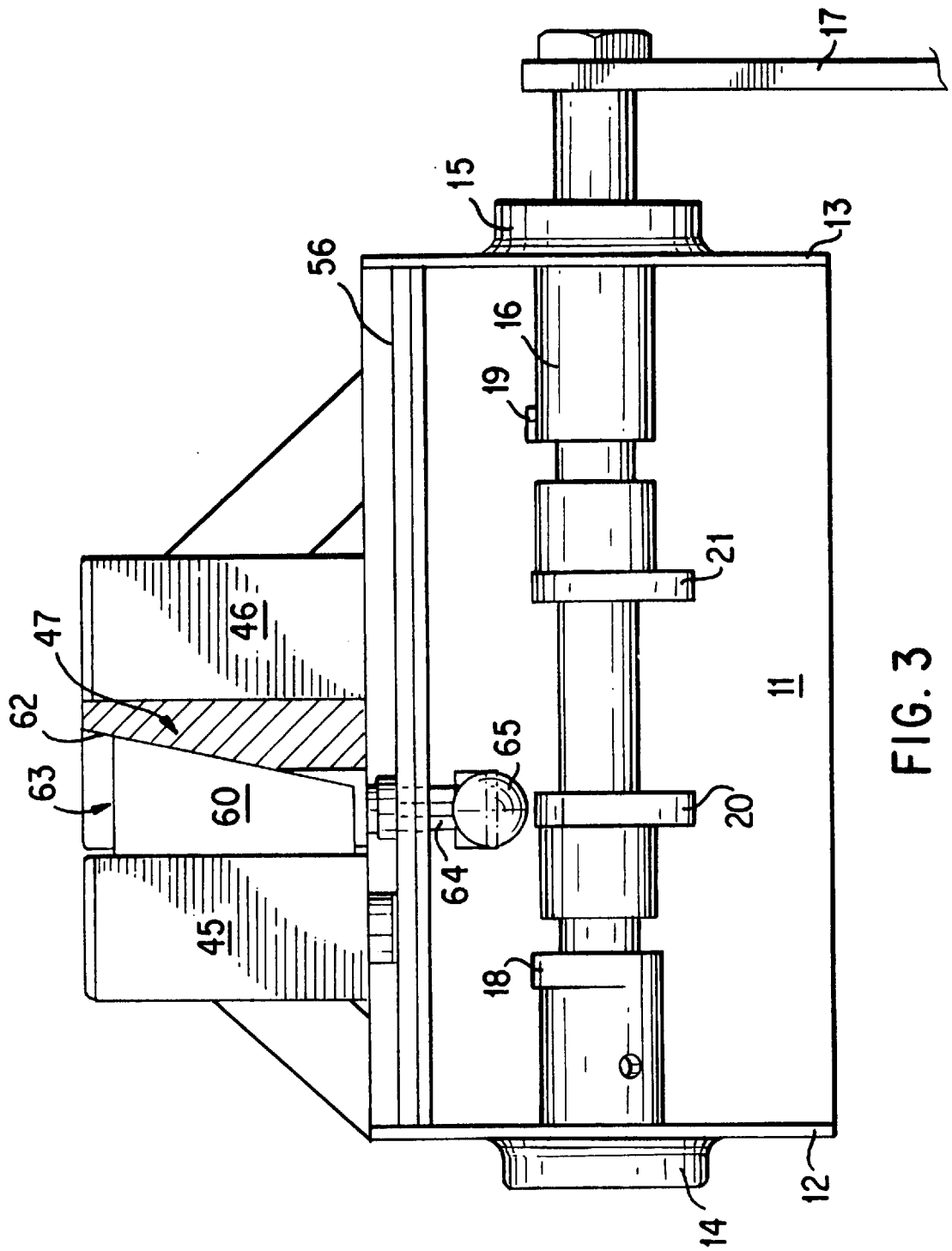
FIG. 3 is a front elevational view similar to that of FIG. 2 but showing the clamping block in its clamping position.

As shown in FIGS. 2 and 3, clamping block 47 has a cavity 63 which receives a slide 60. Slide 60 has an inclined edge 61 which is able to contact an inclined wall 62 of the cavity 63 a lower end of the slide has an arm 64 which is able to contact spherical follower 65. A spring 66A (see FIG. 6) extends about arm 64 and ensures that the slide 60 is biased downwardly into the position shown in FIG. 3. In this position, block 47 is closer to block 46 and a blade may be clamped between block 47 and block 46. The position for the block 47 shown in FIG. 2 shows the slide 60 in its uppermost position and hence a blade receiving gap 66 is present between blocks 46 and 47. The upper position for the slide 60 is achieved when one of the lobes of cam 20 contacts follower 65 to thereby compress the spring 66A and cause the slide 60 to move upwardly. The spring 66A and follower 65 are received within a housing 67 (see FIG. 1).

Figure 5:
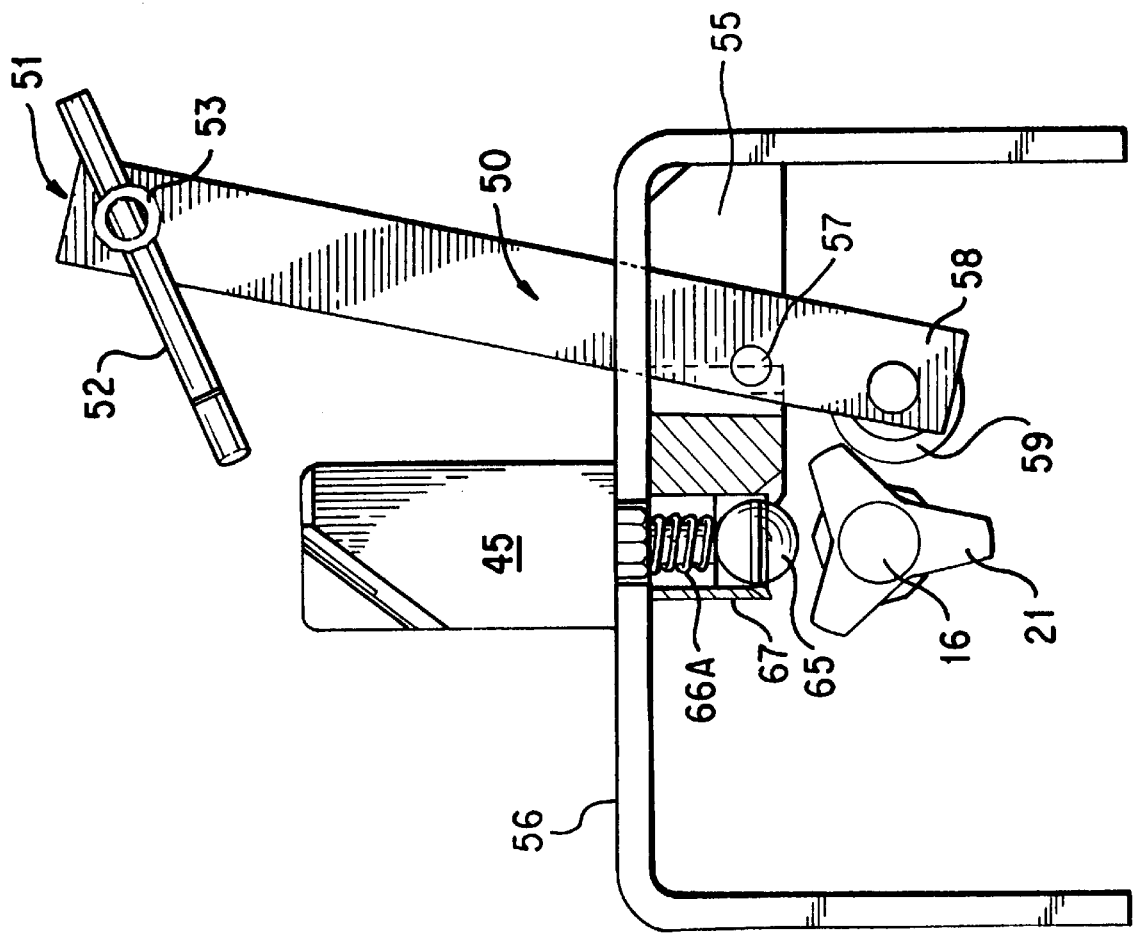
FIG. 5 is a side view of the apparatus taken from the left of FIG. 1 with some of the parts of the apparatus omitted.

FIG. 5 shows the follower 59 carried by lower end 58 of indexing arm 50 in contact with one of the lobes of cam 21. Housing 67 which receives follower 65 and the spring 66A are also shown.

Figure 7:
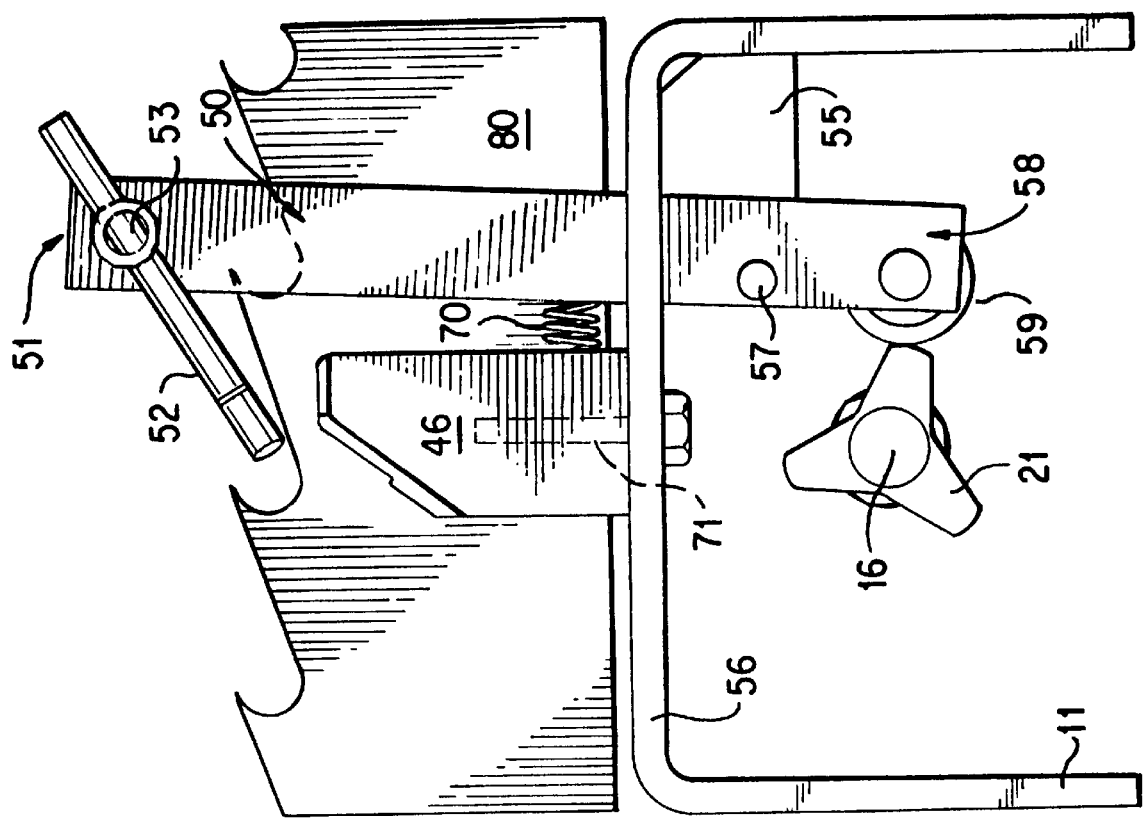
FIG. 7 shows a side diagrammatic view of the apparatus useful in illustrating operation of the indexing arm.
Figure 8:
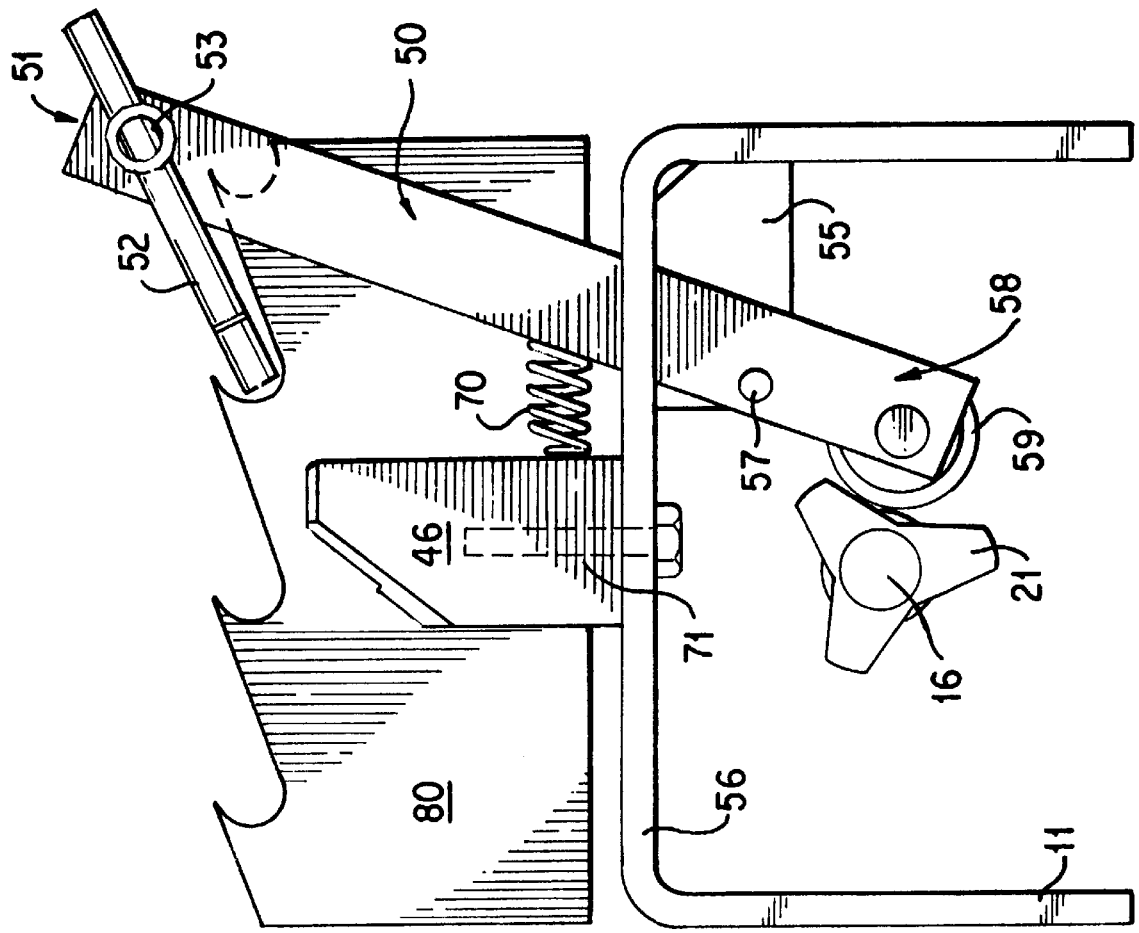
FIG. 8 is a view similar to FIG. 7 but showing the indexing arm in a different position.

As shown in FIGS. 7 and 8, a spring 70 extends between indexing arm 50 and block 46 to ensure that the lower end 58 of arm 50 is biased towards cam 21. Block 46 is secured to upper wall 56 by a fastener 71. Cam 21 causes the arm 50 to move from the FIG. 8 to the FIG. 7 positions to index the blade 80 to present a further tooth of the blade 80 for setting by the setting block.

The operation of the apparatus 10 is as follows. When neither of the cams 18 or 19 are in contact with the respective followers 39 and 40 the setting block 30 is in a neutral position. With the cam configuration shown in the figures, the apparatus 10 is operative to set a first tooth of the blade 80 to one side of the blade while the blade is clamped between blocks 46 and 47. Further rotation of shaft 16 by the handle 17 causes the blocks 46 and 47 to release the blade 80 and indexing arm 50 pivots to cause finger 52 to index the blade 80 through the blocks 46, 47. Further rotation of the shaft 16 causes the blade to be clamped, and then the next tooth is acted upon by the setting block 30 to cause the tooth to be set to the other side of the blade. Further rotation of the shaft then results in the blade being released and indexed again. The setting block 30 then assumes the neutral position and no tooth is set. Further rotation releases the blade and the blade is then indexed and the process repeated. Thus the apparatus allows a first tooth of the blade to be set to one side of the blade, a second tooth to be set to the other side of the blade and a third tooth to remain unset and this sequence may be repeated for all teeth of the blade.

I claim:

1. An apparatus for setting teeth of a blade, the apparatus including:
   a body,
   a control shaft extending across said body,
   a first pair of cams and a second pair of cams mounted on said control shaft,
   a pair of blade clamping blocks mounted on said body for relative movement with respect to one another,
   one block of said pair of blade clamping blocks having a cavity,
   a slide movable within said cavity in said one block,
   a cam follower mounted to said slide,
   said cam follower engaging one cam of said second pair of cams on said control shaft to move said slide within said cavity to thereby clamp the blade within the apparatus.

2. The apparatus of claim 1 including a setting block with opposed setting arms, the setting block being pivotally mounted for pivotal movement about an axis extending transversely of the apparatus.

3. The apparatus of claim 2 wherein the setting block carries spaced cam followers for alternate engagement by the cams of the first pair for pivoting the setting block.

4. The apparatus of claim 2 wherein the setting arms each have a setting finger for engagement with teeth of the blade as the setting block pivots.

5. The apparatus of claim 1 wherein each said cam of the first pair of said cams has one cam lobe.

6. The apparatus of claim 5 wherein the lobes of the cams of the first pair of said cams are radially spaced by 60°.

7. The apparatus of claim 1 wherein the cams of the second pair of said cams each have three cam lobes.

8. The apparatus of claim 7 wherein the lobes on the cams of the second pair are spaced apart by 60°.

9. The apparatus of claim 1 including a pivotally mounted indexing arm having a first and second end, said other cam of said second pair of cams on said control shaft contacting said indexing arm to index the blade within the apparatus.

10. The apparatus of claim 9 by wherein a first end of the indexing arm carries an indexing finger movable into engagement with the blade as the indexing arm pivots to thereby index the blade.

11. The apparatus of claim 9 by wherein said indexing arm has a cam follower engageable with the other cam of said second pair.

12. The apparatus of claim 11 wherein the indexing arm has an indexing finger at one end for engagement with the blade.

13. The apparatus of claim 11 wherein a first spring biases one end of said indexing arm to pivot about a shaft, and a second spring biases said cam follower at the other end of said indexing arm into engagement with the other cam.

* * * * *